(12) United States Patent
Hamano

(10) Patent No.: US 7,193,790 B2
(45) Date of Patent: Mar. 20, 2007

(54) ZOOM LENS SYSTEM AND IMAGE PICKUP APPARATUS INCLUDING THE SAME

(75) Inventor: Hiroyuki Hamano, Koga (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/373,800

(22) Filed: Mar. 9, 2006

(65) Prior Publication Data

US 2006/0221462 A1 Oct. 5, 2006

(30) Foreign Application Priority Data

Apr. 1, 2005 (JP) .............................. 2005-106351

(51) Int. Cl.
G02B 15/14 (2006.01)
(52) U.S. Cl. ...................................... 359/687; 359/740
(58) Field of Classification Search ................ 359/687, 359/739, 740
See application file for complete search history.

(56) References Cited

U.S. PATENT DOCUMENTS

| 4,854,684 | A | * | 8/1989 | Horiuchi ..................... 359/687 |
| 5,424,869 | A |   | 6/1995 | Nanjo |
| 6,016,228 | A |   | 1/2000 | Uzawa |
| 6,456,441 | B2 |  | 9/2002 | Hoshi |
| 6,975,461 | B2 |  | 12/2005 | Eguchi |

FOREIGN PATENT DOCUMENTS

| JP | 6-34882 A | 2/1994 |
| JP | 10-62687 A | 3/1998 |
| JP | 2001-194586 A | 7/2001 |
| JP | 2003-315676 A | 11/2003 |

* cited by examiner

Primary Examiner—Scott J. Sugarman
(74) Attorney, Agent, or Firm—Canon USA, Inc. Intellectual Property Division

(57) ABSTRACT

At least one exemplary embodiment is directed to a zoom lens system which includes a first lens unit having a positive optical power, a second lens unit having a negative optical power and positioned on the image side of the first lens unit, a third lens unit having a positive optical power and positioned on the image side of the second lens unit, a fourth lens unit having a positive optical power and positioned on the image side of the third lens unit, and an F-number determining member. The F-number determining member can be positioned between a vertex of an object-side lens surface of a lens that is nearest to an object side in the third lens unit and an intersecting point of the object-side lens surface and a peripheral portion of the lens in a direction of an optical axis.

10 Claims, 8 Drawing Sheets

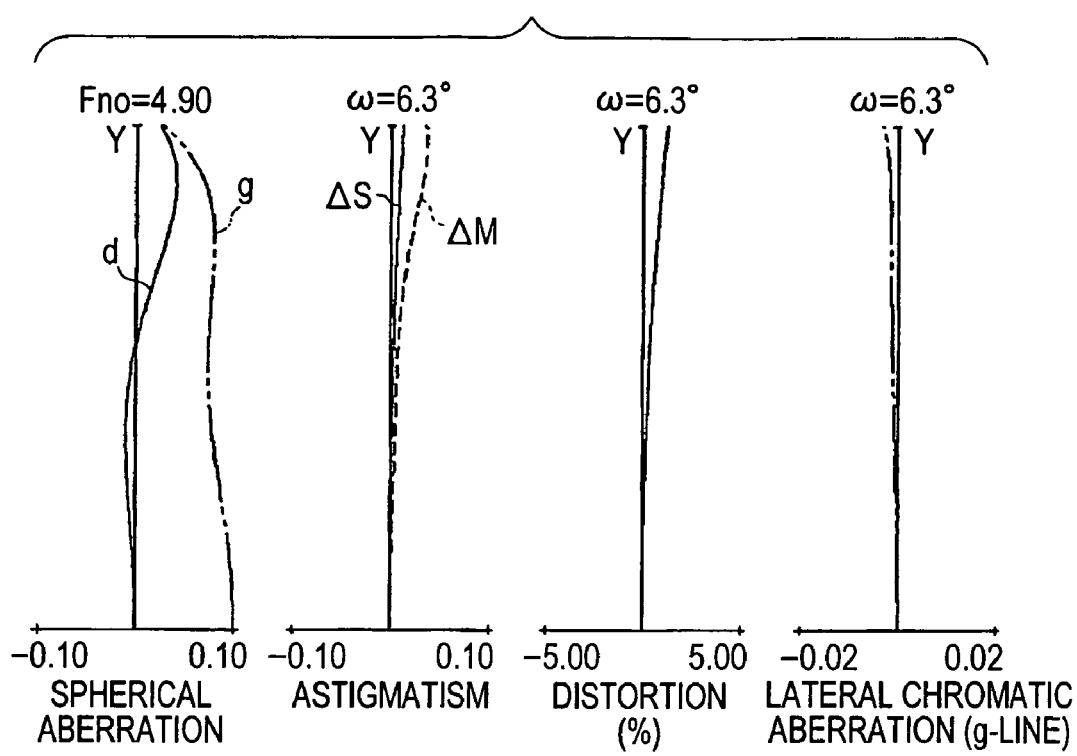
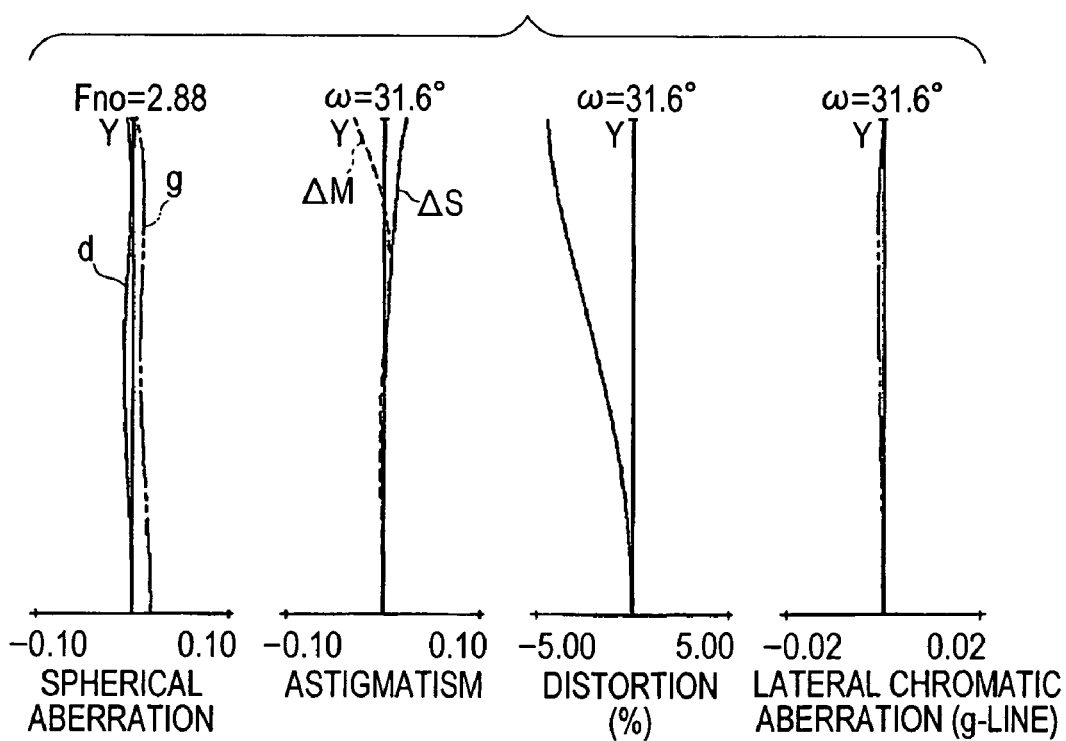

ZOOM LENS SYSTEM AND IMAGE PICKUP APPARATUS INCLUDING THE SAME

BACKGROUND OF THE INVENTION

1. Field of the Invention

The present invention relates to a zoom lens system and an image pickup apparatus including the zoom lens system.

2. Description of the Related Art

Recently, image pickup apparatuses including solid-state image pickup devices and those used in video cameras, digital still cameras, broadcasting cameras, film cameras like silver salt film cameras, etc., have become smaller with increased functionality. Accordingly, demand has increased for small, high-definition zoom lenses for use in imaging optical systems of the image pickup apparatuses.

So-called rear-focus zoom lenses, in which lens units other than a first lens unit on the object side are moved for focusing, are known as zoom lenses that meet such a demand (refer to, for example, Japanese Patent Laid-Open No. 6-34882, which corresponds to U.S. Pat. No. 5,424,869, and Japanese Patent Laid-Open No. 10-62687, which corresponds to U.S. Pat. No. 6,016,228).

In a typical rear-focus zoom lens, an effective diameter of the first lens unit is generally small compared to that in a zoom lens having a first lens unit that moves during focusing. Therefore, the size of the overall lens system can be reduced. In addition, close-range shooting (in particular, extra-close-range shooting) can be easily performed. In addition, since small, light lens units are moved, the lens units can be driven with a small driving force and focusing can be performed quickly.

In order to achieve both a reduction in the size of a camera (particularly the size in an unused state) and a high zoom ratio, collapsible (retractable) zoom lenses are commonly used. 'Collapse (retract)' refers to a process or a state in which distances between the lens units in the unused state are set to be smaller than those in a shooting state. Accordingly, an amount of projection of the lens system from the main body of the camera can be reduced.

In general, if the number of lenses is reduced while the refractive powers of the lens units are increased in order to reduce the size of the optical system, the thicknesses of the lenses are increased. Accordingly, when the refractive powers of the lens units are simply increased, the overall length of the optical system is typically not sufficiently reduced. In addition, it can become difficult to correct aberrations.

In addition, when a lens system is structured such that it can be collapsed in an unused state, errors like lens tilt can be unavoidably increased because of the mechanical structure of the lens system. Therefore, if sensitivity to eccentricity of the lens units is large, the optical performance can be degraded or image shake can occur during zooming.

According to a zoom lens discussed in Japanese Patent Laid-Open No. 6-34882, which corresponds to U.S. Pat. No. 5,424,869, zooming can be performed by moving only a second lens unit and a fourth lens unit. In this case, almost the entire function of changing the magnification must be provided by the second lens unit. Therefore, the refractive powers of the first lens unit and the second lens unit must be increased and sensitivity to eccentricity is increased accordingly.

In comparison, in a zoom lens discussed in Japanese Patent Laid-Open No. 10-62687, which corresponds to U.S. Pat. No. 6,016,228, sensitivity to eccentricity of a first lens unit and a second lens unit are relatively small. Therefore, this zoom lens facilitates a retractable structure.

SUMMARY OF THE INVENTION

At least one exemplary embodiment is directed to a new high-zoom-ratio zoom lens system that facilitates a retractable structure and that has good optical performance.

At least one exemplary embodiment is directed to a zoom lens system which includes a first lens unit having a positive optical power, a second lens unit having a negative optical power and positioned on the image side of the first lens unit, a third lens unit having a positive optical power and positioned on the image side of the second lens unit, a fourth lens unit having a positive optical power and positioned on the image side of the third lens unit, and an F-number determining member. The F-number determining member can be positioned between a vertex of an object-side lens surface of a lens that is nearest to an object side in the third lens unit and an intersecting point of the object-side lens surface and a peripheral portion of the lens in a direction of an optical axis.

Further features of the present invention will become apparent from the following description of exemplary embodiments with reference to the attached drawings.

BRIEF DESCRIPTION OF THE DRAWINGS

FIG. 7 illustrates an aberration diagram of the zoom lens according to the second exemplary embodiment at a telephoto end.

FIG. 8 illustrates an aberration diagram of a zoom lens according to a third exemplary embodiment at a wide-angle end.

DESCRIPTION OF THE EMBODIMENTS

Figure 1:
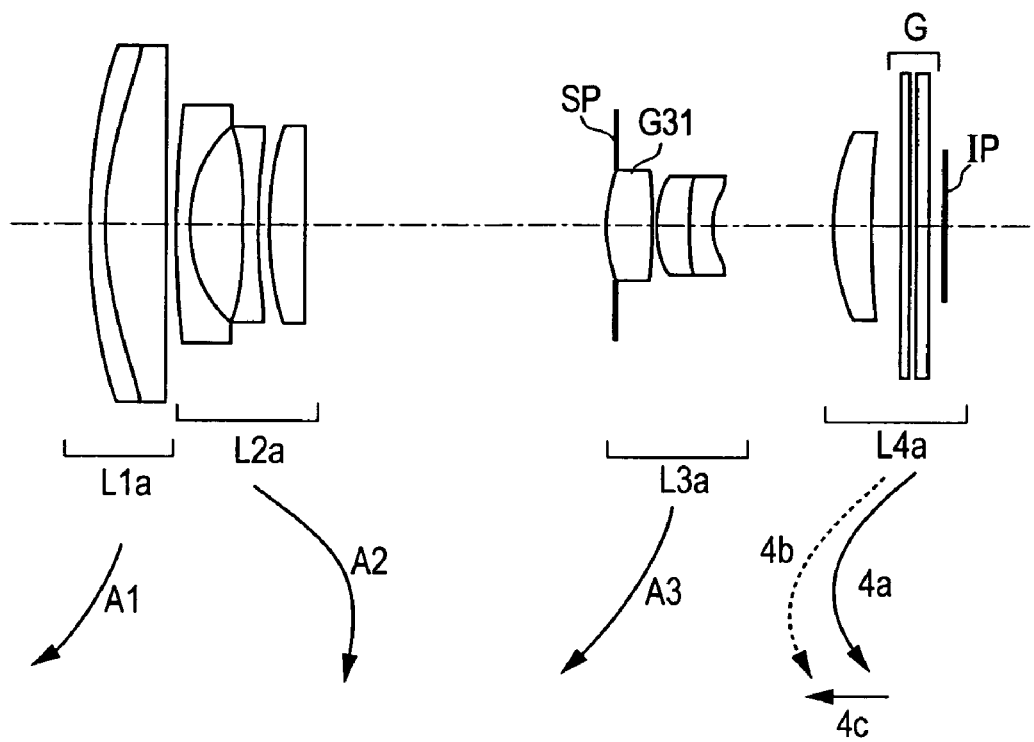
FIG. 1 illustrates an optical sectional view of a zoom lens according to a first exemplary embodiment.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Zoom lens systems and an image pickup apparatus including a zoom lens system according to exemplary embodiments will be described below.

Figure 2:
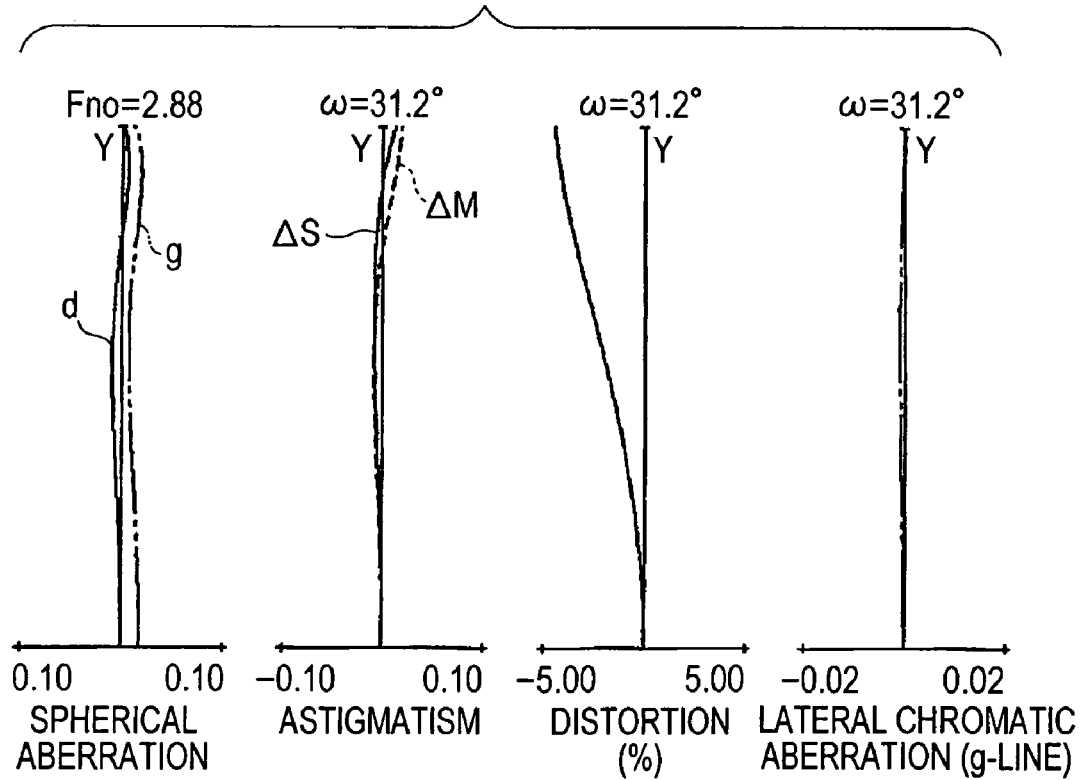
FIG. 2 illustrates an aberration diagram of the zoom lens according to the first exemplary embodiment at a wide-angle end.
Figure 3:
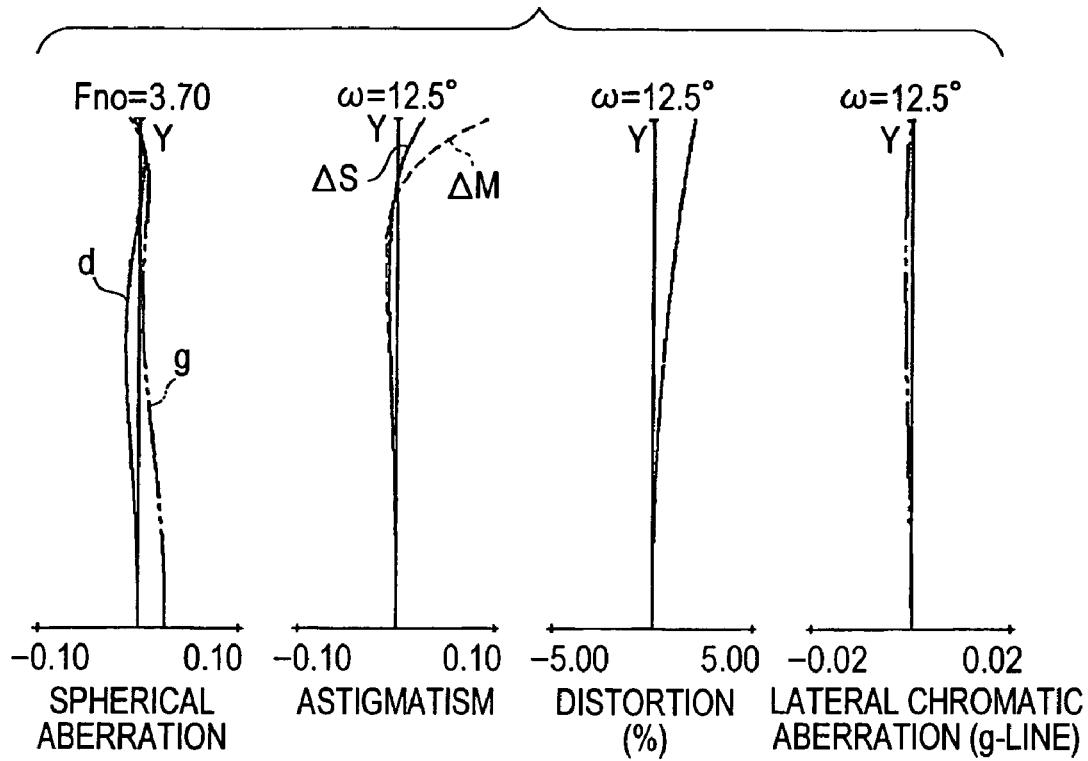
FIG. 3 illustrates an aberration diagram of the zoom lens according to the first exemplary embodiment at a middle zoom position.
Figure 4:
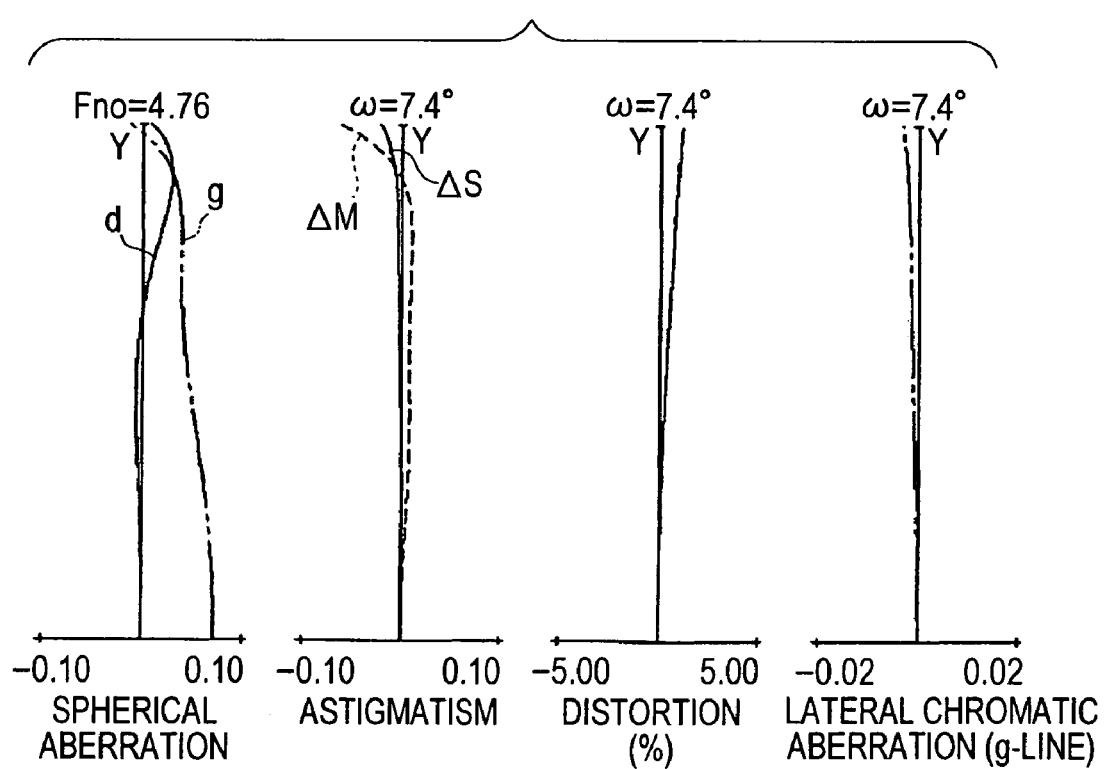
FIG. 4 illustrates an aberration diagram of the zoom lens according to the first exemplary embodiment at a telephoto end.

FIG. 1 illustrates an optical sectional view of a zoom lens according to a first exemplary embodiment at a wide-angle end (short-focal-length end). FIGS. 2, 3, and 4 are aberration diagrams of the zoom lens according to the first exemplary embodiment at a wide-angle end, a middle zoom position, and a telephoto end (long-focal-length end), respectively. The non-limiting example of a zoom lens according to the first exemplary embodiment has a zoom ratio of 4.75 and an F number of about 2.88 to 4.76.

Figure 5:
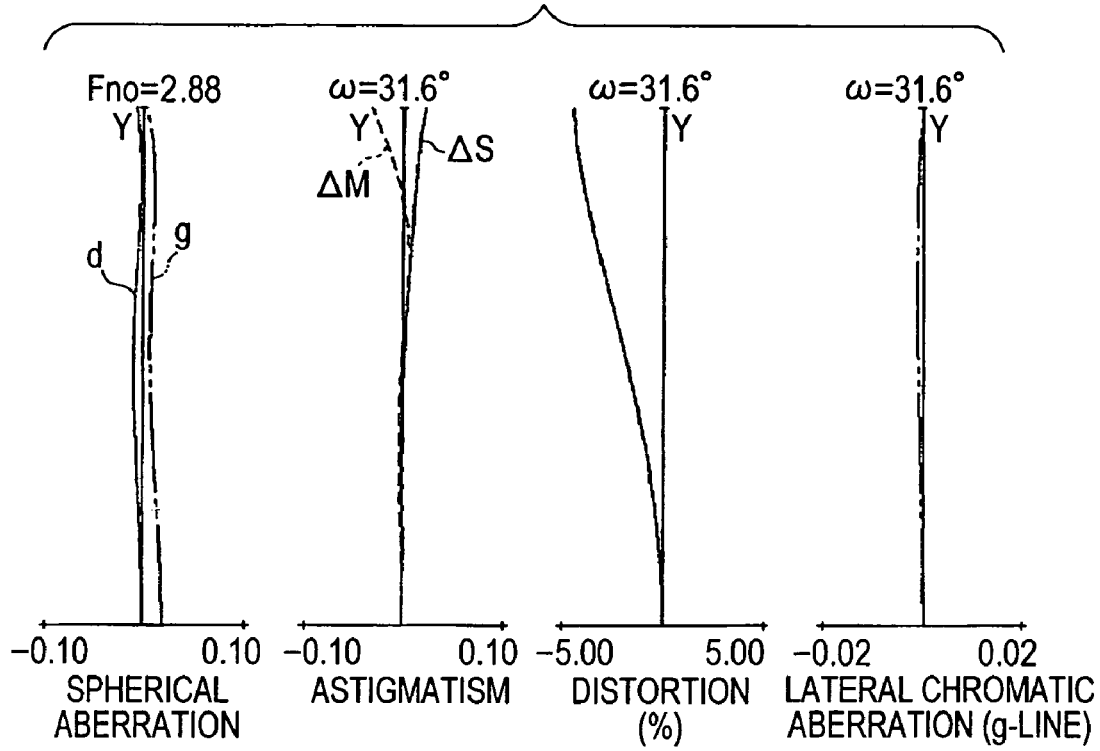
FIG. 5 illustrates an aberration diagram of a zoom lens according to a second exemplary embodiment at a wide-angle end.
Figure 6:
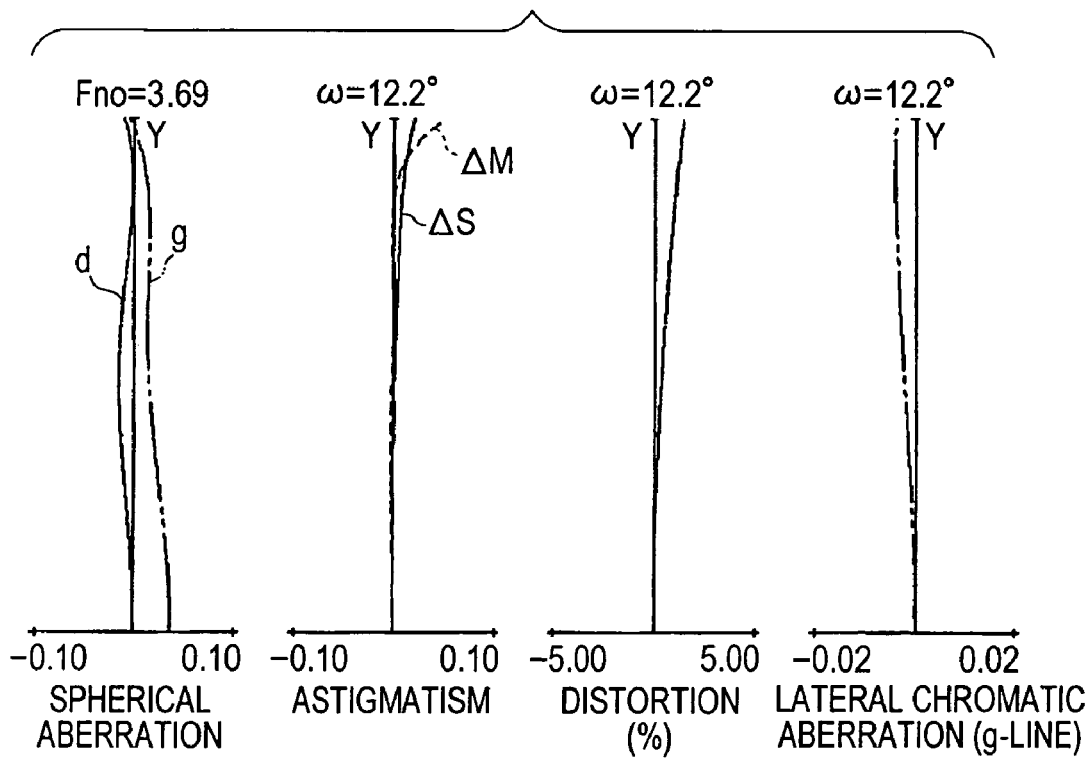
FIG. 6 illustrates an aberration diagram of the zoom lens according to the second exemplary embodiment at a middle zoom position.

FIGS. 5, 6, and 7 are aberration diagrams of a zoom lens according to a second exemplary embodiment at a wide-angle end, a middle zoom position, and a telephoto end, respectively. The zoom lens according to the second exemplary embodiment has a zoom ratio of 5.59 and an F number of about 2.88 to 4.90.

Figure 9:
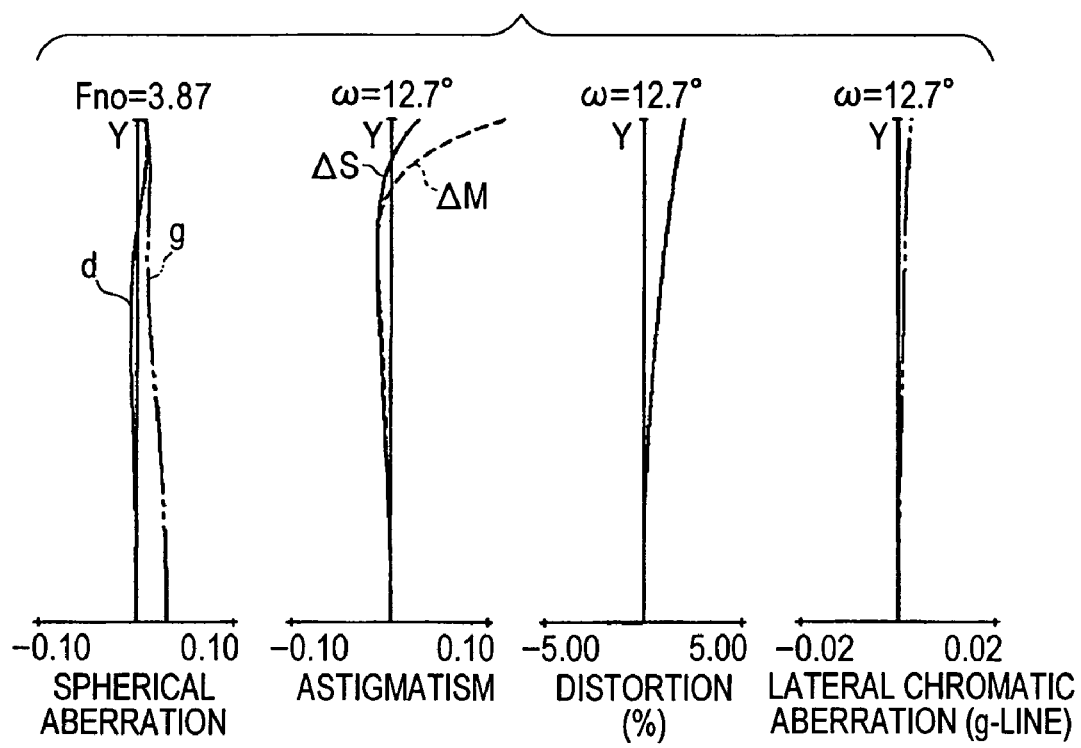
FIG. 9 illustrates an aberration diagram of the zoom lens according to the third exemplary embodiment at a middle zoom position.
Figure 10:
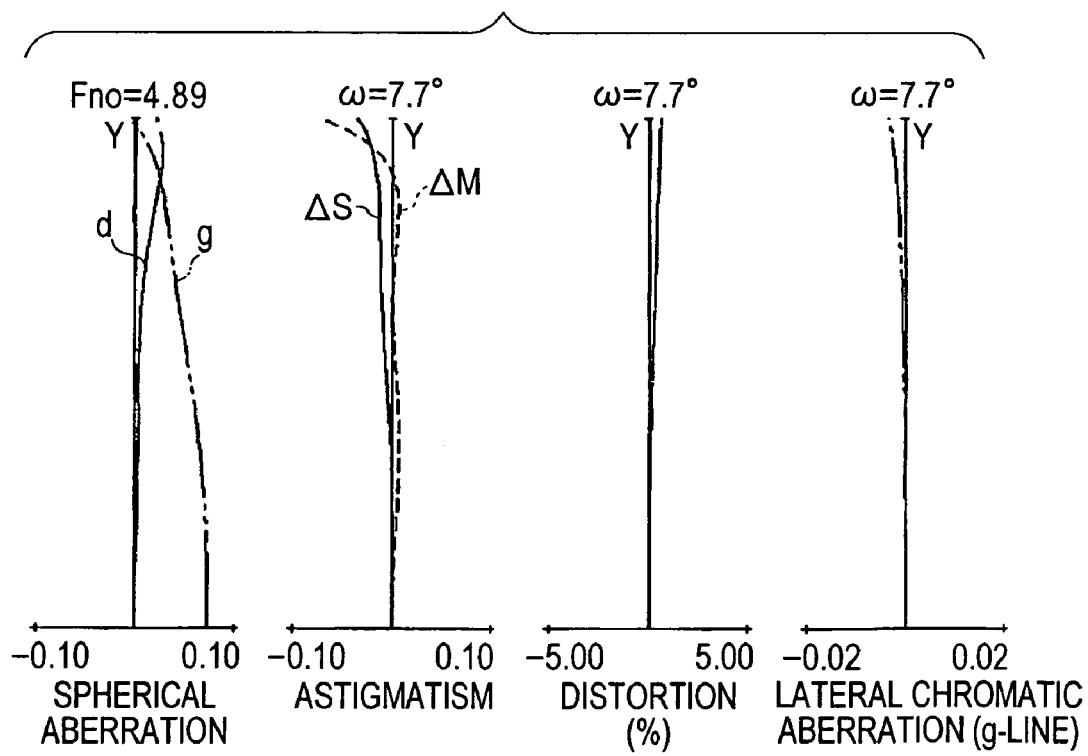
FIG. 10 illustrates an aberration diagram of the zoom lens according to the third exemplary embodiment at a telephoto end.

FIGS. 8, 9, and 10 are aberration diagrams of a zoom lens according to a third exemplary embodiment at a wide-angle end, a middle zoom position, and a telephoto end, respectively. The non limiting example of a zoom lens according to the third exemplary embodiment has a zoom ratio of 4.72 and an F number of about 2.88 to 4.89.

The cross-sectional structures of the zoom lenses according to the second and third exemplary embodiments are similar to that of the zoom lens according to the first exemplary embodiment shown in FIG. 1, and are therefore not shown in the figures. However, numerical values including the radius of curvature can differ for each exemplary embodiment (see numerical examples provided below).

Figure 11:
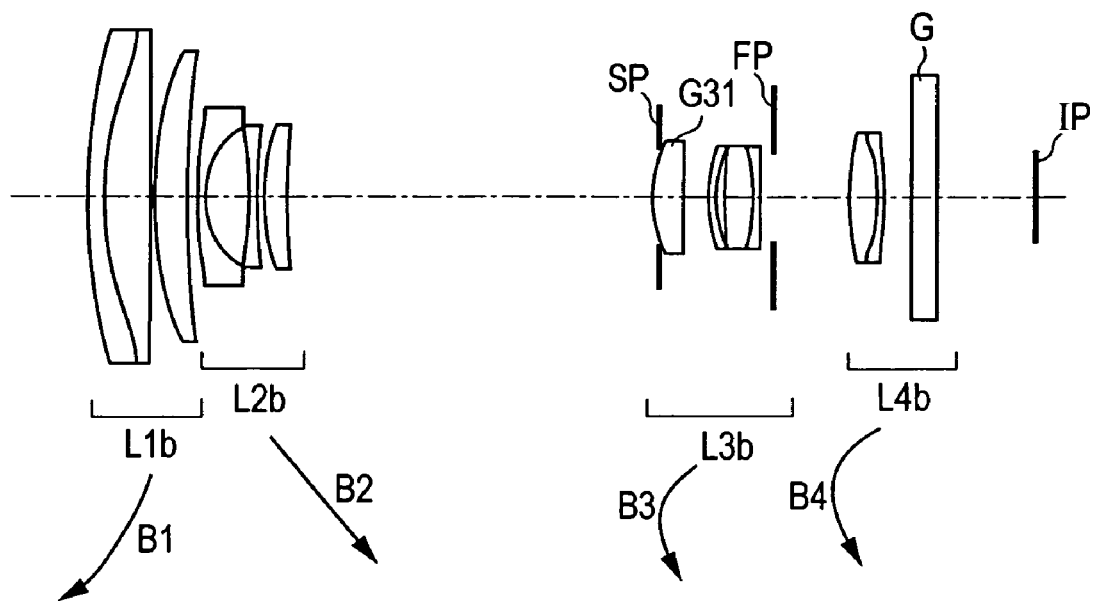
FIG. 11 illustrates an optical sectional view of a zoom lens according to a fourth exemplary embodiment.
Figure 12:
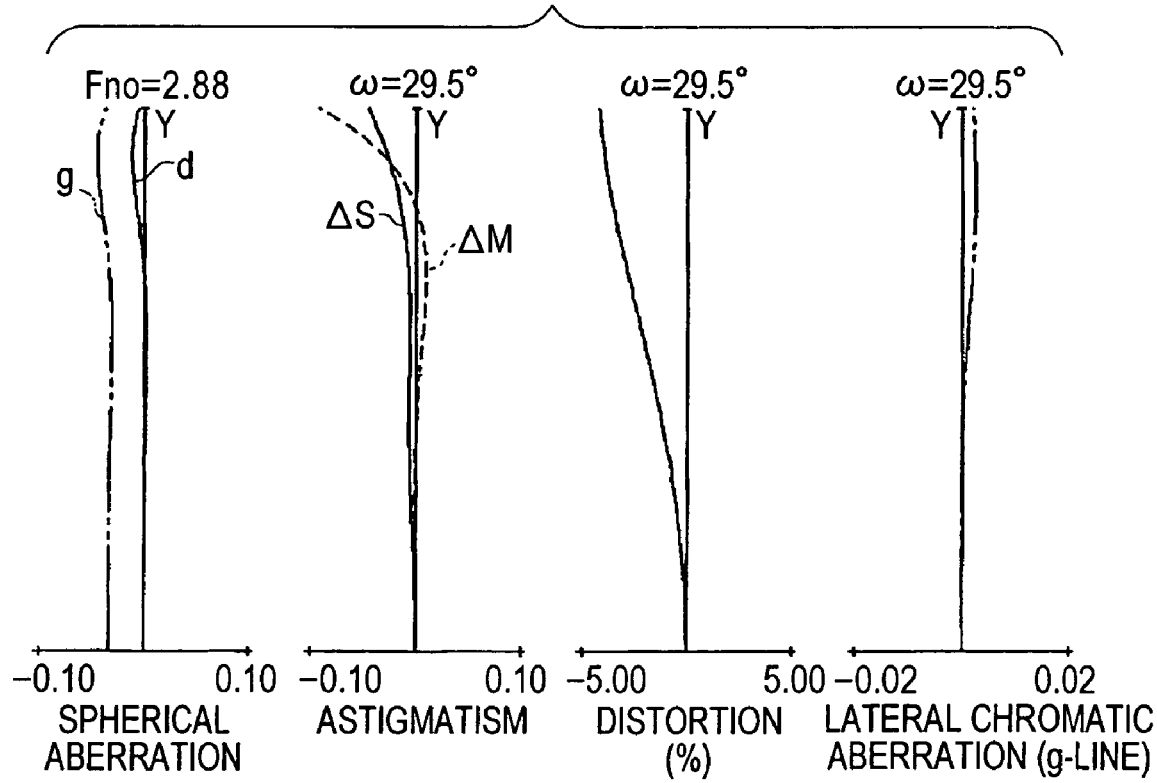
FIG. 12 illustrates an aberration diagram of the zoom lens according to the fourth exemplary embodiment at a wide-angle end.
Figure 13:
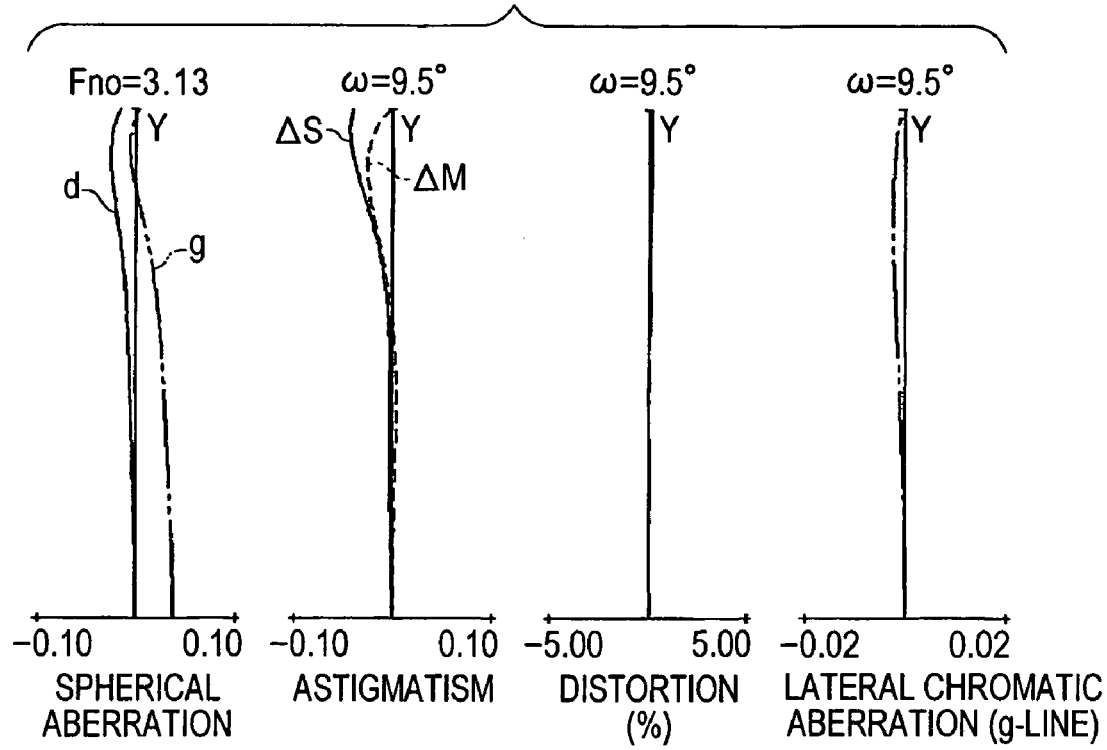
FIG. 13 illustrates an aberration diagram of the zoom lens according to the fourth exemplary embodiment at a middle zoom position.
Figure 14:
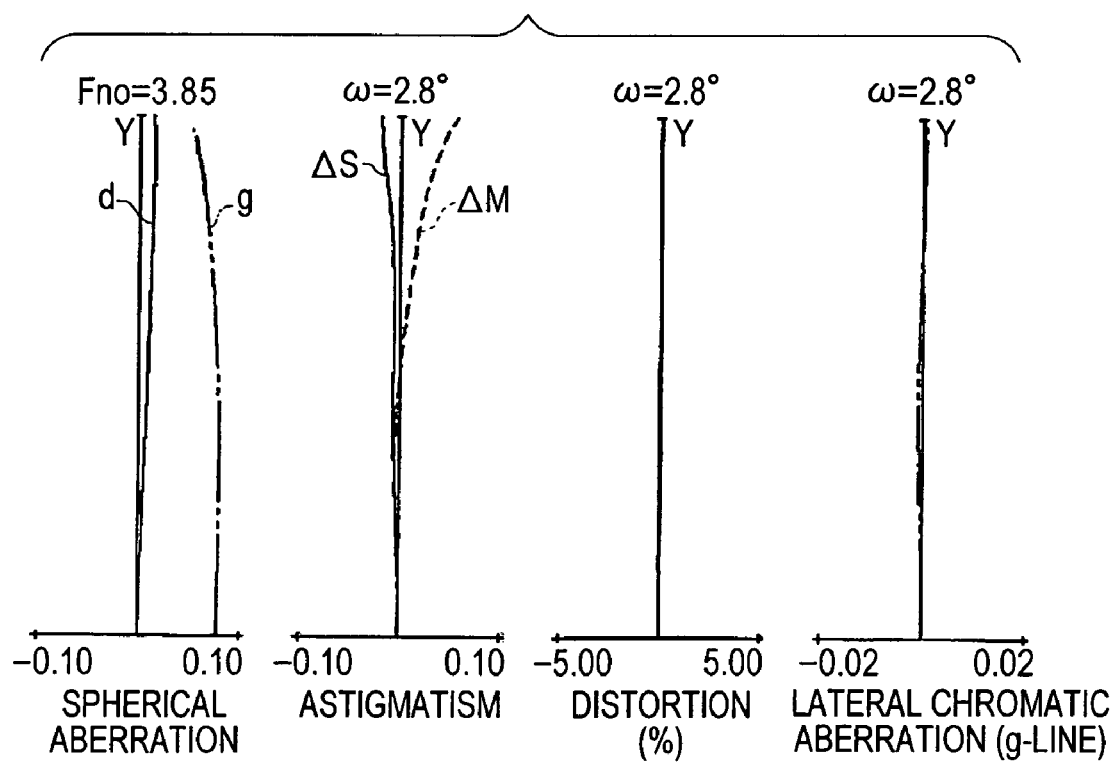
FIG. 14 illustrates an aberration diagram of the zoom lens according to the fourth exemplary embodiment at a telephoto end.

FIG. 11 illustrates an optical sectional view of a zoom lens according to a fourth exemplary embodiment at a wide-angle end. FIGS. 12, 13, and 14 are aberration diagrams of the zoom lens according to the fourth exemplary embodiment at a wide-angle end, a middle zoom position, and a telephoto end, respectively. The non limiting example of a zoom lens according to the fourth exemplary embodiment has a zoom ratio of 11.59 and an opening ratio of about 2.88 to 3.85.

Figure 15:
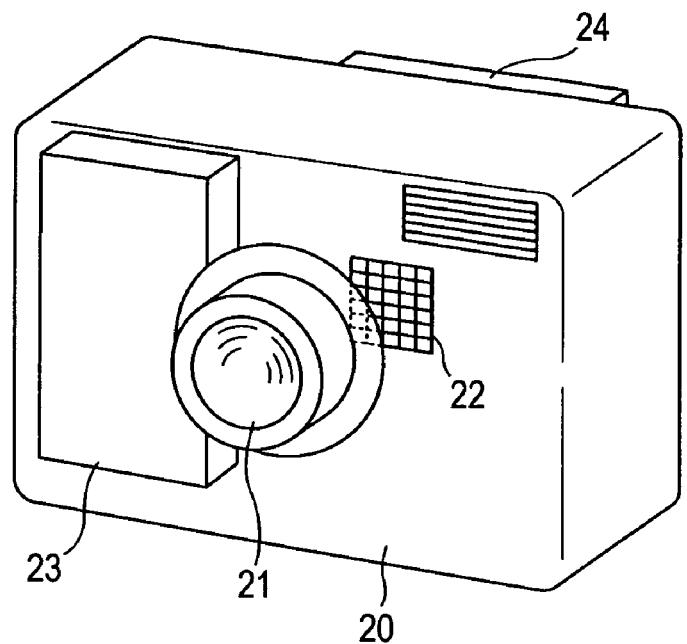
FIG. 15 illustrates a schematic diagram showing the major part of an image pickup apparatus.

FIG. 15 illustrates a schematic diagram showing the major part of a digital still camera including a zoom lens system according to at least one exemplary embodiment.

Figure 16:
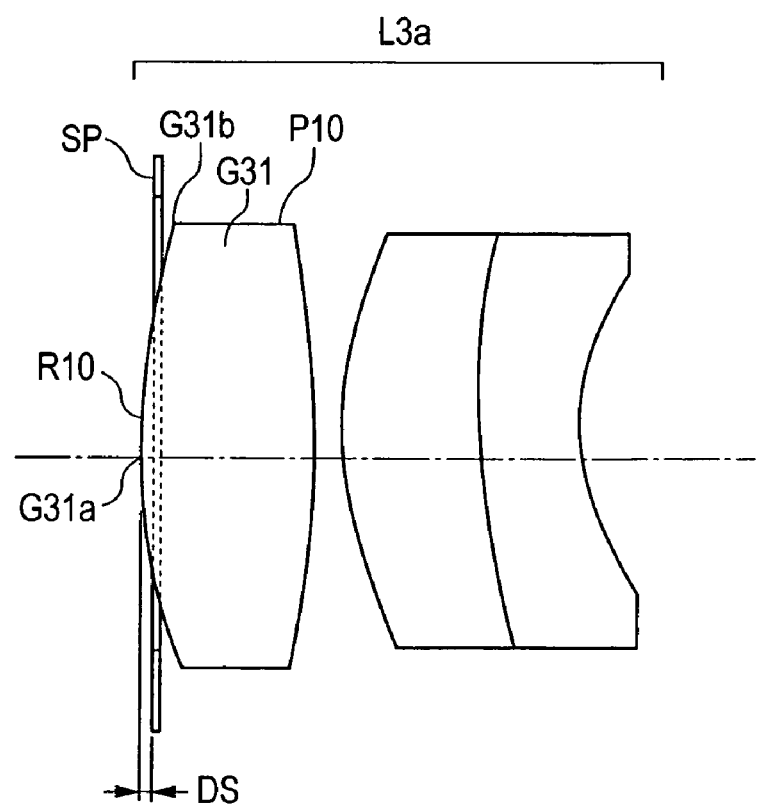
FIG. 16 illustrates a schematic diagram showing an F-number determining member.

FIG. 16 is an enlarged diagram of a part of FIG. 1, illustrating the arrangement of an F-number determining member L3a.

The zoom lens according to each exemplary embodiment can be an image pickup lens system that can be used in an image pickup apparatus. In the sectional views shown in FIGS. 1 and 11, the object side (front) is at the left and the image side (rear) is at the right.

In the sectional views shown in FIGS. 1 and 11, L1$a$–$b$ denotes a first lens unit having a positive refractive power (optical power is the reciprocal of focal length), L2$a$–$b$ denotes a second lens unit having a negative refractive power, L3$a$–$b$ denotes a third lens unit having a positive refractive power, L4$a$–$b$ denotes a fourth lens unit having a positive refractive power, and SP denotes an F-number determining member that determines (restricts) the minimum (full aperture) F-number luminous flux (F-number luminous flux on the axis).

In FIG. 11, FP denotes a flare diaphragm. G denotes an optical block corresponding to, for example, an optical filter, a faceplate, a quartz low-pass filter, and an infrared-cut filter, and other filters as known by one of ordinary skill in the relevant arts and equivalents, and IP denotes an image plane. When the zoom lens of each exemplary embodiment is used as an image pickup optical system of a video camera or a digital still camera, the image plane IP corresponds to the image pickup plane of a solid-state image pickup device (photoelectric converter), such as a charged coupled device (CCD) sensor and a metal-oxide semiconductor (CMOS) sensor or other image pick-up devices as known by one of ordinary skill in the relevant arts and equivalents. When the zoom lens of each exemplary embodiment is used as an image pickup optical system of a film camera (e.g., a silver salt film camera), the image plane IP corresponds to a film surface.

In the aberration diagrams, d and g indicate the d-line and the g-line, respectively, and $\Delta M$ and $\Delta S$ indicate a meridional image plane and a sagittal image plane, respectively. The lateral chromatic aberration is shown by the g-line. In addition, $\omega$ is the half angle of view (half field angle), and Fno is the F number.

In each exemplary embodiment, the wide-angle end and the telephoto end are zoom positions corresponding to the states in which the second and third lens units are at one and the other ends of a moveable range on an optical axis.

As shown in FIGS. 1 and 11, in each exemplary embodiment, during zooming from the wide-angle end to the telephoto end, the first lens unit L1$a$–$b$ moves toward the object side (A1 and B1), the second lens unit L2$a$ in FIG. 1 moves along a locus that is convex toward the image side (A2), where the second lens unit L2$b$ moves linearly in the image direction for the embodiment illustrated in FIG. 11, the third lens unit L3$a$ moves toward the object side in FIG. 1 where the third lens unit L3$b$ in FIG. 11 moves convex toward the object side, and the fourth lens unit L4$a$–$b$ moves along a locus that is convex toward the object side.

In addition, a focusing method in which the fourth lens unit L4$a$–$b$ is moved along the optical axis for focusing can be applied (e.g., 4$c$ of FIG. 1).

Focusing from an object at infinity to a close object can be performed by moving the fourth lens unit forward, as shown by the arrow 4$c$ in FIG. 1. The solid curve 4$a$ and the dashed curve 4$b$ shown in FIG. 1 respectively represent loci of the fourth lens unit L4$a$–$b$ during zooming from the wide-angle end to the telephoto end while an object at infinity is in focus and while a close object is in focus. In each exemplary embodiment, focusing is quickly performed by moving the fourth lens unit L4a–b for focusing.

During zooming, the first lens unit L1a–b and the second lens unit L2a–b are moved such that the first lens unit L1a–b is positioned nearer to the object side and the second lens unit L2a–b is positioned nearer to the image side at the telephoto end than at the wide-angle end. Accordingly, the length of the overall lens system is reduced and a high zoom ratio can be obtained.

The position of the F-number determining member SP will be described below with reference to FIG. 16. As shown in FIG. 16, the F-number determining member SP is positioned between a vertex G31a of an object-side lens surface R10 of a lens G31 that is nearest to the object side in the third lens unit L3a and an intersecting point G31b of the lens surface R10 and a peripheral portion (edge portion P10) of the lens G31 in the direction of the optical axis. A lens having a convex surface on the object side can be used as the lens G31. Note that a similar arrangement of the F-number determining member SP can be configured with the third lens unit L3b.

Accordingly, the F-number determining member SP can be disposed in the third lens unit L3a–b and can be moved together with the third lens unit L3a–b during zooming, so that the distance between the entrance pupil, which relates to the arrangement of the F-number determining member SP, and the first lens unit L1a–b is reduced in the wide-angle region. Thus, facilitating the prevention of increasing the outer diameters (effective diameters) of the lenses included in the first lens unit L1a–b.

Since the F-number determining member SP is positioned nearer to the image side than the object-side vertex G31a in the third lens unit L3a–b, the lens distance between the second lens unit L2a–b and the third lens unit L3a–b at the telephoto end is reduced. Accordingly, the length of the overall lens system is reduced. In addition, according to the above-described arrangement, the height of the axial paraxial ray that passes through the third lens unit L3a–b can be reduced. Therefore, the spherical aberration and the coma aberration can be easily corrected.

In each of the exemplary embodiments, the length of the lens system in the collapsed state can be reduced by arranging the F-number determining member SP in the above-described manner.

Next, features of additional exemplary embodiments other than those described above will be explained below.

The features described below can be applied to the zoom lens systems according to exemplary embodiments.

When D23T is the distance between the vertex of the lens surface nearest to the image side in the second lens unit L2a–b and the vertex of the lens surface nearest to the object side in the third lens unit at the telephoto end and fw is the focal length of the overall system at the wide-angle end, the following condition can be satisfied:

$$4.5 < 100 \cdot D23T/fw < 10 \quad (1)$$

When the value of Conditional Expression (1) is below the lower limit, the distance between the second and third lens units L2a–b and L3a–b can be too short and there is a risk that the second lens unit L2a–b and the third lens unit L3a–b mechanically interfere with each other due to error factors. When the value of Conditional Expression (1) is above the upper limit, the distance between the second and third lens units L2a–b and L3a–b can be too long and it is difficult to reduce the size of the overall lens system.

The numerical range of Conditional Expression (1) can also be set as follows:

$$5.0 < 100 \cdot D23T/fw < 9 \quad (1a)$$

When DS is the distance between the vertex G31a of the object-side lens surface of the lens G31 nearest to the object side in the third lens unit L3a and the F-number determining member SP along the optical axis, the F-number determining member SP is disposed at a position where the following condition is satisfied:

$$4.5 < 100 \cdot DS/fw < 10 \quad (2)$$

When the value of Conditional Expression (2) is below the lower limit, it can be difficult to reduce the distance between the second and third lens units L2a–b and L3a–b. When the value of Conditional Expression (2) is above the upper limit, the vertex G31a of the object-side surface of the lens G31 can be too close to the F-number determining member SP and there can be a risk that they will interference with each other.

The numerical range of Conditional Expression (2) can also be set as follows:

$$5 < 100 \cdot DS/fw < 9 \quad (2a)$$

In order to reduce the length of the overall lens system while maintaining good lens performance, when fw, ft, f2 are the focal length of the overall system at the wide-angle end, the focal length of the overall system at the telephoto end, and the focal length of the second lens unit L2a–b, respectively, the following condition can be satisfied:

$$0.3 < |f2|/\sqrt{(fw \cdot ft)} < 0.9 \quad (3)$$

When the focal length of the second lens unit L2a–b is too short, that is, when the refractive power is too high and the value of Conditional Expression (3) is below the lower limit, it can be difficult to correct the astigmatism during zooming. When the focal length of the second lens unit L2a–b is too long, that is, when the refractive power is too low and the value of Conditional Expression (3) is above the upper limit, it can be difficult to reduce the size of the overall lens system.

The numerical range of Conditional Expression (3) can also be set as follows:

$$0.4 < |f2|/\sqrt{(fw \cdot ft)} < 0.8 \quad (3a)$$

In order to reduce variation in the chromatic aberration during zooming, at least one positive lens can be included in the second lens unit L2a–b. In addition, in order to reliably correct the spherical aberration at the telephoto end, the positive lens can have a convex surface on the object side.

In order to reduce the length of the overall lens system and the diameter of the front lens, when f3 is the focal length of the third lens unit L3a–b and M1 (positive sign) is the amount of movement of the first lens unit L1a–b toward the object side during zooming from the wide-angle end to the telephoto end (i.e., the changing amount between the position of the first lens unit L1a–b at the wide-angle end and that at the telephoto end), the following expressions can be satisfied:

$$1.5 < f3/fw < 5.0 \quad (4)$$

$$0.3 < M1/fw < 3.0 \quad (5)$$

When the focal length of the third lens unit L3a–b is too short and the value of Conditional Expression (4) is below the lower limit, it can be difficult to correct the spherical aberration and the coma aberration at the wide-angle end. When the value of Conditional Expression (4) is above the upper limit, the amount of movement of the third lens unit L3a–b for zooming is increased and it can be difficult to reduce the length of the overall lens system.

When the amount of movement of the first lens unit L1a–b is too small and the value of Conditional Expression (5) is below the lower limit, the contribution of the first lens unit L1a–b to changing the magnification is reduced. As a result, it can be difficult to reduce the length of the overall lens system at the wide-angle end. Alternatively, the diameter of the first lens unit L1a–b is increased. When the value of Conditional Expression (5) is above the upper limit, a complex cam mechanism may be required for moving the first lens unit L1a–b.

The numerical ranges of Conditional Expressions (4) and (5) can also be set as follows:

$$1.7 < f3/fw < 4.5 \quad (4a)$$

$$0.4 < M1/fw < 2.5 \quad (5a)$$

Although the first lens unit L1a–b can be formed of a single positive lens, at least one negative lens can be included in the first lens unit L1a–b to obtain a zoom ratio of 5 or more. Accordingly, the correction or reduction of the chromatic aberration can be facilitated and the size of the overall lens system can be reduced.

In order to reliably correct the spherical aberration at the wide-angle end, the third lens unit L3a–b can have at least one aspherical surface. In addition, the fourth lens unit L4a–b can have an aspherical surface. In this case, variation in the aberrations during focusing can be easily reduced.

The third lens unit L3a–b can include at least one negative lens having a concave surface on the image side. Accordingly, variation in the aberrations during zooming can be reduced.

In the first to third exemplary embodiments, the first lens unit L1a–b can include a combination lens obtained by combining a negative meniscus lens having a convex surface on the object side and a positive lens.

The second lens unit L2a–b can include a negative meniscus lens having a convex surface on the object side, a negative lens having a concave surface on the object side, and a positive lens having a convex surface on the object side in order from the object side to the image side.

The third lens unit L3a–b can include a biconvex positive lens having convex surfaces on both the object side and the image side, a positive meniscus lens having a convex surface on the object side, and a negative lens.

The fourth lens unit L4a–b can include a single positive lens.

In the zoom lens according to the fourth exemplary embodiment, the first lens unit L1a–b can include a combination lens obtained by combining a negative meniscus lens having a convex surface on the object side and a positive lens, and a positive meniscus lens having a convex surface on the object side.

The second lens unit L2a–b can include a negative meniscus lens having a convex surface on the object side, a negative lens having a concave surface on the object side, and a positive lens having a convex surface on the object side in order from the object side to the image side.

The third lens unit L3a–b can include a biconvex positive lens having convex surfaces on both the object side and the image side, a negative meniscus lens having a convex surface on the object side, and a combination lens obtained by combining a positive lens and a negative lens.

The fourth lens unit L4a–b can include a combination lens obtained by combining a biconvex positive lens having convex surfaces on both the object side and the image side and a negative meniscus lens having a convex surface on the image side.

In each exemplary embodiment, the length of the overall lens system can be reduced by applying the above-described structure and a zoom lens having good optical performance for the entire zoom area between the wide-angle end and the telephoto end can be obtained.

Next, first to fourth numerical examples corresponding to the first to fourth exemplary embodiments, respectively, will be described. In each numerical example, i indicates the surface number counted from the object side, Ri indicates the radius of curvature of the $i^{th}$ lens surface ($i^{th}$ surface), Di indicates the distance between the $i^{th}$ and $(i+1)^{th}$ lens surfaces, and Ni and vi indicate the refractive index and the Abbe number, respectively, based on the d-line.

The optical block G is formed by four surfaces nearest to the image side in the first to third numerical examples, and by two surfaces nearest to the image side in the fourth numerical example.

When x is the displacement from the surface vertex along the optical axis at a height of h from the optical axis, the shape of an aspherical surface is expressed as follows:

$$x = (h^2/R)/[1+\{1-(1+k)(h/R)^2\}^{1/2}] + Bh^4 + Ch^6 + Dh^8 + Eh^{10}$$

where k is the conic constant, A, B, C, D, and E are the aspherical coefficients, and R is the paraxial radius of curvature.

In addition, "e-0X" indicates "$\times 10^{-x}$." In addition, f is the focal length, Fno is the F number, and ω is the half field angle. Table 1 provided below shows the values of the above-described conditional expressions in each numerical example.

The values of D10 in the first to third numerical examples and the value of D12 in the fourth numerical example are negative since the F-number determining member and the lens G31 of the third lens L3a–b are counted in that order from the object side. In the lens structure shown in FIG. 16, the F-number determining member SP is nearer to the image side than the vertex G31a of the object-side surface of the lens G31 by a distance corresponding to the absolute value of D10 or D12.

Numerical Example 1
f = 5.80 to 27.56, Fno = 2.88 to 4.76, 2ω = 62.4° to 14.8°

| R1 = 28.791 | D1 = 0.80 | N1 = 1.846660 | v1 = 23.9 |
| R2 = 21.383 | D2 = 3.00 | N2 = 1.696797 | v2 = 55.5 |
| R3 = −655.389 | D3 = variable | | |
| R4 = 53.140 | D4 = 0.65 | N3 = 1.882997 | v3 = 40.8 |

-continued

| | | | |
|---|---|---|---|
| R5 = 6.495 | D5 = 2.62 | | |
| R6 = −22.629 | D6 = 0.60 | N4 = 1.696797 | ν4 = 55.5 |
| R7 = 26.474 | D7 = 0.60 | | |
| R8 = 14.047 | D8 = 1.70 | N5 = 1.846660 | ν5 = 23.9 |
| R9 = 7035.019 | D9 = variable | | |
| R10 = ∞ | D10 = −0.50 | | |
| R11 = 7.423 (aspherical) | D11 = 2.30 | N6 = 1.589130 | ν6 = 61.1 |
| R12 = −18.799 (aspherical) | D12 = 0.10 | | |
| R13 = 4.623 | D13 = 1.70 | N7 = 1.487490 | ν7 = 70.2 |
| R14 = 11.276 | D14 = 1.10 | N8 = 1.846660 | ν8 = 23.9 |
| R15 = 3.468 | D15 = variable | | |
| R16 = 10.807 (aspherical) | D16 = 2.00 | N9 = 1.743300 | ν9 = 49.3 |
| R17 = 103.972 | D17 = 1.38 | | |
| R18 = ∞ | D18 = 0.36 | N10 = 1.516330 | ν10 = 64.1 |
| R19 = ∞ | D19 = 0.36 | | |
| R20 = ∞ | D20 = 0.58 | N11 = 1.516330 | ν11 = 64.1 |
| R21 = ∞ | | | |

| | Focal Length | | |
|---|---|---|---|
| Variable Distance | 5.80 | 20.97 | 27.56 |
| D3 | 0.40 | 13.37 | 14.90 |
| D9 | 15.19 | 2.03 | 0.90 |
| D15 | 5.99 | 10.44 | 14.52 |

Aspherical Coefficients

| | | | | |
|---|---|---|---|---|
| R11: k = 3.21855e−1 | B = −1.91029e−4 | C = −3.94650e−6 | D = 7.12847e−7 | E = 6.63382e−8 |
| R12: k = 0.0 | B = 4.52627e−4 | C = 9.42567e−7 | D = 1.67443e−6 | E = 0.0 |
| R16: k = 0.0 | B = 1.12490e−5 | C = 5.92620e−7 | D = 0.0 | E = 0.0 |

Numerical Example 2
f = 5.80 to 32.40, Fno = 2.88 to 4.90, 2ω = 63.2° to 12.6°

| | | | |
|---|---|---|---|
| R1 = 25.537 | D1 = 0.80 | N1 = 1.846660 | ν1 = 23.9 |
| R2 = 18.301 | D2 = 3.00 | N2 = 1.696797 | ν2 = 55.5 |
| R3 = 73177.959 (aspherical) | D3 = variable | | |
| R4 = 39.338 | D4 = 0.65 | N3 = 1.882997 | ν3 = 40.8 |
| R5 = 6.395 | D5 = 2.80 | | |
| R6 = −17.350 | D6 = 0.60 | N4 = 1.487490 | ν4 = 70.2 |
| R7 = 17.191 | D7 = 0.60 | | |
| R8 = 12.713 | D8 = 1.70 | N5 = 1.846660 | ν5 = 23.9 |
| R9 = 78.231 | D9 = variable | | |
| R10 = ∞ | D10 = −0.40 | | |
| R11 = 7.233 (aspherical) | D11 = 2.30 | N6 = 1.589130 | ν6 = 61.1 |
| R12 = −18.161 (aspherical) | D12 = 0.10 | | |
| R13 = 4.880 | D13 = 1.70 | N7 = 1.487490 | ν7 = 70.2 |
| R14 = 11.832 | D14 = 1.10 | N8 = 1.846660 | ν8 = 23.9 |
| R15 = 3.525 | D15 = variable | | |
| R16 = 10.580 (aspherical) | D16 = 2.00 | N9 = 1.743300 | ν9 = 49.3 |
| R17 = 72.110 | D17 = 1.38 | | |
| R18 = ∞ | D18 = 0.36 | N10 = 1.516330 | ν10 = 64.1 |
| R19 = ∞ | D19 = 0.36 | | |
| R20 = ∞ | D20 = 0.58 | N11 = 1.516330 | ν11 = 64.1 |
| R21 = ∞ | | | |

| | Focal Length | | |
|---|---|---|---|
| Variable Distance | 5.80 | 22.55 | 32.40 |
| D3 | 0.40 | 13.90 | 16.09 |
| D9 | 15.35 | 2.35 | 0.89 |
| D15 | 5.48 | 10.18 | 14.87 |

Aspherical Coefficients

| | | | | |
|---|---|---|---|---|
| R3: k = 1.59724e+6 | B = 1.42828e−6 | C = −1.81062e−9 | D = 0.0 | E = 0.0 |
| R11: k = −7.44163e−1 | B = −7.95191e−5 | C = −1.11603e−6 | D = 1.05448e−6 | E = −5.43135e−8 |
| R12: k = 0.0 | B = 1.67249e−4 | C = 1.30557e−5 | D = −6.14383e−7 | E = 0.0 |
| R16: k = 0.0 | B = 4.36404e−5 | C = 2.71512e−7 | D = 0.0 | E = 0.0 |

Numerical Example 3
f = 5.60 to 26.45, Fno = 2.88 to 4.89, 2ω = 65.0° to 15.4°

| | | | |
|---|---|---|---|
| R1 = 30.161 | D1 = 0.80 | N1 = 1.846660 | ν1 = 23.9 |
| R2 = 22.737 | D2 = 2.80 | N2 = 1.696797 | ν2 = 55.5 |
| R3 = −249.556 | D3 = variable | | |

-continued

| | | | |
|---|---|---|---|
| R4 = 51.379 | D4 = 0.65 | N3 = 1.882997 | ν3 = 40.8 |
| R5 = 6.277 | D5 = 2.56 | | |
| R6 = −37.365 | D6 = 0.60 | N4 = 1.701536 | ν4 = 41.2 |
| R7 = 28.813 | D7 = 0.60 | | |
| R8 = 11.843 | D8 = 1.70 | N5 = 1.922860 | ν5 = 18.9 |
| R9 = 30.792 | D9 = variable | | |
| R10 = ∞ | D10 = −0.30 | | |
| R11 = 7.584 (aspherical) | D11 = 2.30 | N6 = 1.583126 | ν6 = 59.4 |
| R12 = −16.263 (aspherical) | D12 = 0.10 | | |
| R13 = 4.396 | D13 = 1.70 | N7 = 1.487490 | ν7 = 70.2 |
| R14 = 11.882 | D14 = 1.10 | N8 = 1.846660 | ν8 = 23.9 |
| R15 = 3.381 | D15 = variable | | |
| R16 = 10.627 (aspherical) | D16 = 2.00 | N9 = 1.743300 | ν9 = 49.3 |
| R17 = 277.104 | D17 = 1.38 | | |
| R18 = ∞ | D18 = 0.36 | N10 = 1.516330 | ν10 = 64.1 |
| R19 = ∞ | D19 = 0.36 | | |
| R20 = ∞ | D20 = 0.58 | N11 = 1.516330 | ν11 = 64.1 |
| R21 = ∞ | | | |

| | Focal Length | | |
|---|---|---|---|
| Variable Distance | 5.60 | 20.46 | 26.45 |
| D3 | 0.40 | 12.58 | 14.18 |
| D9 | 13.70 | 1.48 | 0.60 |
| D15 | 5.04 | 9.83 | 13.92 |

Aspherical Coefficients

| | | | | |
|---|---|---|---|---|
| R11: k = 4.03720e−1 | B = −2.68674e−4 | C = −4.63426e−6 | D = 1.69402e−7 | E = 1.36982e−7 |
| R12: k = 0.0 | B = 4.31807e−4 | C = −4.69007e−6 | D = 2.12783e−6 | E = 0.0 |
| R16: k = 0.0 | B = 3.12388e−6 | C = 9.58565e−8 | D = 0.0 | E = 0.0 |

Numerical Example 4
f = 6.28 to 72.79, Fno = 2.88 to 3.85, 2ω = 59.2° to 5.6°

| | | | |
|---|---|---|---|
| R1 = 62.183 | D1 = 1.40 | N1 = 1.846660 | ν1 = 23.9 |
| R2 = 33.825 | D2 = 4.20 | N2 = 1.487490 | ν2 = 70.2 |
| R3 = −951.487 | D3 = 0.20 | | |
| R4 = 32.903 | D4 = 3.00 | N3 = 1.772499 | ν3 = 49.6 |
| R5 = 104.356 | D5 = variable | | |
| R6 = 39.682 | D6 = 0.90 | N4 = 1.834000 | ν4 = 37.2 |
| R7 = 7.807 | D7 = 3.78 | | |
| R8 = −24.361 | D8 = 0.65 | N5 = 1.772499 | ν5 = 49.6 |
| R9 = 34.126 | D9 = 0.80 | | |
| R10 = 18.397 | D10 = 2.00 | N6 = 1.922860 | ν6 = 18.9 |
| R11 = 107.902 | D11 = variable | | |
| R12 = ∞ | D12 = −0.50 | | |
| R13 = 11.401 (aspherical) | D13 = 2.70 | N7 = 1.583126 | ν7 = 59.4 |
| R14 = −62.098 | D14 = 2.30 | | |
| R15 = 14.467 | D15 = 0.70 | N8 = 1.834000 | ν8 = 37.2 |
| R16 = 8.896 | D16 = 0.80 | | |
| R17 = 40.017 | D17 = 2.50 | N9 = 1.496999 | ν9 = 81.5 |
| R18 = −12.790 | D18 = 0.60 | N10 = 1.567322 | ν10 = 42.8 |
| R19 = 175.614 | D19 = 1.18 | | |
| R20 = flare diaphragm | D20 = variable | | |
| R21 = 23.932(aspherical) | D21 = 2.40 | N11 = 1.696797 | ν11 = 55.5 |
| R22 = −12.873 | D22 = 0.60 | N12 = 1.846660 | ν12 = 23.9 |
| R23 = −27.745 | D23 = 2.30 | | |
| R24 = ∞ | D24 = 2.20 | N13 = 1.516330 | ν13 = 64.1 |
| R25 = ∞ | | | |

| | Focal Length | | |
|---|---|---|---|
| Variable Distance | 6.28 | 35.04 | 72.79 |
| D5 | 0.80 | 25.25 | 32.80 |
| D11 | 33.12 | 6.71 | 0.90 |
| D20 | 6.82 | 4.39 | 9.30 |

Aspherical Coefficients

| | | | | |
|---|---|---|---|---|
| R13: k = 5.66835e−1 | B = 2.85720e−5 | C = 2.60049e−5 | D = 3.03277e−7 | E = −1.98977e−9 |
| R21: k = −3.88911 | B = 2.88744e−5 | C = −2.79289e−7 | D = 4.37256e−9 | |

TABLE 1

| Conditional Expression | | 1st Example | 2nd Example | 3rd Example | 4th Example |
|---|---|---|---|---|---|
| (1) | 100 · D23T/fw | 6.893 | 8.441 | 5.357 | 6.328 |
| (2) | 100 · DS/fw | 8.621 | 6.897 | 5.357 | 7.962 |
| (3) | $|f2|/\sqrt{fw \cdot ft}$ | 0.748 | 0.673 | 0.736 | 0.487 |
| (4) | f3/fw | 1.833 | 1.863 | 1.816 | 4.108 |
| (5) | M1/fw | 1.847 | 1.932 | 2.001 | 0.472 |

Next, a digital still camera (image pickup apparatus) including the zoom lens system according to an exemplary embodiment as an imaging optical system will be described below with reference to FIG. 15.

With reference to FIG. 15, the digital still camera includes a camera body 20; an imaging optical system 21 including the zoom lens system according to an exemplary embodiment; a solid-state image pickup device (photoelectric converter) 22, such as a CCD sensor and a CMOS sensor, that is mounted in the camera body 20 and that receives an object image formed by the imaging optical system 21; a memory 23 that records information corresponding to the object image obtained as a result of photoelectric conversion performed by the image-pickup device 22; and a finder 24 including a liquid crystal display panel or other display and can be used to observe the object image formed on the solid-state image pickup device 22.

Accordingly, when a zoom lens system according to an exemplary embodiment is applied to an image pickup apparatus, such as a digital still camera, a small image pickup apparatus having good optical performance can be obtained.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-106351 filed Apr. 1, 2005, which is hereby incorporated by reference herein in its entirety.

What is claimed is:

1. A zoom lens system comprising:
a first lens unit having a positive optical power;
a second lens unit having a negative optical power, the second lens unit being positioned on an image side of the first lens unit;
a third lens unit having a positive optical power, the third lens unit being positioned on the image side of the second lens unit;
a fourth lens unit having a positive optical power, the fourth lens unit being positioned on the image side of the third lens unit; and
an F-number determining member that determines a luminous flux of a minimum F-number, the F-number determining member being positioned between a vertex of an object-side lens surface of a lens that is nearest to an object side in the third lens unit and an intersecting point of the object-side lens surface and a peripheral portion of the lens in a direction of an optical axis,
wherein the second lens unit, the third lens unit, and the fourth lens unit move during zooming.

2. The zoom lens system according to claim 1, wherein when D23T is the distance between a vertex of a lens surface nearest to the image side in the second lens unit and the vertex of the lens surface nearest to the object side in the third lens unit at the telephoto end and fw is the focal length of the overall system at the wide-angle end, the following condition is satisfied:

$4.5 < 100 \cdot D23T/fw < 10$.

3. The zoom lens system according to claim 1, wherein when DS is the distance between the vertex of the object-side lens surface of the lens that is nearest to the object side in the third lens unit and the F-number determining member along the optical axis, the following condition is satisfied:

$4.5 < 100 \cdot DS/fw < 10$.

4. The zoom lens system according to claim 1, wherein a lens that is nearest to the image side in the second lens unit is a positive lens having a convex surface on the object side.

5. The zoom lens system according to claim 1, wherein the third lens unit includes a negative lens having a concave surface on the image side.

6. The zoom lens system according to claim 1, wherein when f2 is the focal length of the second lens unit and fw and ft are the focal lengths of the overall system at the wide-angle end and the telephoto end, respectively, the following condition is satisfied:

$0.3 < |f2|/\sqrt{(fw \cdot ft)} < 0.9$.

7. The zoom lens system according to claim 1, wherein the first lens unit moves during zooming.

8. The zoom lens system according to claim 7, wherein when f3 is the focal length of the third lens unit, M1 is the amount of movement of the first lens unit toward the object side during zooming from the wide-angle end to the telephoto end, and fw is the focal length of the overall system at the wide-angle end, the following conditions are satisfied:

$1.5 < f3/fw < 5.0$ $0.3 < M1/fw < 3.0$.

9. The zoom lens system according to claim 1, wherein the zoom lens system forms an image on a solid-state image pickup device.

10. An image pickup apparatus comprising:
the zoom lens system according to claim 1; and
a solid-state image pickup device that receives an image formed by the zoom lens system.

* * * * *